United States Patent Office 2,933,373
Patented Apr. 19, 1960

2,933,373

BENEFICIATION OF TITANIFEROUS IRON ORES

Frank E. Love, Henderson, Leland R. Lyons, Boulder City, and John C. Priscu, Las Vegas, Nev., assignors to Titanium Metals Corporation of America, New York, N.Y., a corporation of Delaware No Drawing. Application May 6, 1957
Serial No. 657,024

6 Claims. (Cl. 23—202)

This invention relates to the beneficiation of titaniferous iron ores and more particularly to a process for treating such ores to produce a titanium dioxide-containing concentrate adapted for chlorination to produce titanium tetrachloride.

Rutile has heretofore been preferred as a raw material for production of titanium tetrachloride. The chlorination is simple, and the limited amount of iron present causes no difficulties in separation of reaction by-products. A titaniferous iron ore such as ilmenite would be more economical than a high titanium dioxide content ore such as rutile, but its use has been hindered by its relatively high iron content which may range up to 65% on an oxide basis. Several methods have been proposed for utilization of ilmenite. A chlorination treatment in which both the iron and titanium content are simultaneously chlorinated results in a mixture comprising titanium tetrachloride and ferric chloride from which it is difficult to separate the desired titanium tetrachloride. In addition there appears to be no profitable market for the ferric chloride produced and its chlorine is therefore a serious economic loss. Preferential chlorination, in which the iron content is first chlorinated separately, has been found to avoid many of the problems which arise in separating titanium tetrachloride from ferric chloride. Such preferential chlorination, however, often results in appreciable loss of titanium tetrachloride with the ferric chloride by-product, and in addition, the ferric chloride produced involves, as with total chlorination, a loss in chlorine value.

It is therefore the object of this invention to provide an improved method for production of a titanium dioxide concentrate from a titaniferous iron ore. A further object of this invention is to provide a process for treating a titaniferous iron ore to produce a titanium dioxide concentrate adapted for chlorination to produce titanium tetrachloride. Yet another object of this invention is to provide a more economical process for producing a titanium dioxide concentrate from a titaniferous iron ore. These and other objects of this invention will be apparent from the following detailed description thereof.

This invention in its broadest aspects contemplates first reducing the iron oxide content of a titaniferous iron ore to convert the iron content thereof essentially to divalent state. The reduced ore is then subjected to selective chlorination in which its iron content is converted principally to ferrous chloride which is separated. The resulting concentrate will comprise titanium dioxide in admixture with between about 10% to 35% carbonaceous residue, and this mixture is ideally suited for further chlorination to produce titanium tetrachloride.

The term "titaniferous iron ore" as employed herein, is intended to embrace ores and compositions generally which contain appreciable proportions of titanium and iron generally in the form of their oxides. Ilmenite is an example of a typical and abundant titaniferous iron ore which may advantageously be employed in the process of this invention. Ores containing ilmenite and additional proportions of oxidic iron compounds are also intended to be included, as well as natural and prepared materials and concentrates containing titanium and oxidic iron compounds in substantial amounts.

The term "carbonaceous reducing agent" as employed herein is intended to embrace carbon, coal, coke and other materials which on combustion will produce carbon or carbon compounds in a form adapted for use as reducing agents.

The reduction step of the process of this invention may be conducted in any convenient manner. Preferably it is accomplished by treating subdivided ore in a suitable furnace which may be of shaft-type, refractory lined. Titaniferous iron ore of average fineness between 30 mesh and 150 mesh is charged into the furnace together with carbonaceous reducing agent of fineness between 20 and 100 mesh, in amount between 15 to 35% of the titaniferous iron ore employed. The carbonaceous reducing agent is ignited, and ignition and reaction is sustained by passage upwardly through the mixture of an oxygen containing gas such as air. It has been observed that the reduction reaction proceeds rapidly at temperatures between 600 and 800° C., and sufficient air flow and combustion is arranged to maintain this temperature in the bed. Introduction of air for combustion through the bottom of the bed of sub-divided solids results in agitation and maintenance of the mixture in turbulent motion so that desired reaction conditions may readily be maintained. If desired, the gas flow and particle fineness of the titaniferous iron ore and carbonaceous reducing agent may be arranged so that a so-called fluidized bed type of conditions is attained. Such fluidized bed conditions result in rapid reaction and reduction, although an agitated bed maintained under conditions of motion less than that which is characterized by the fluidized conditions, will be found to be adequate for the purposes of the steps of this process. It is desirable to maintain the carbonaceous reducing agent content of the bed so that it amounts to between 15 and 35% of the ore during the reduction reaction to insure the presence of adequate carbon in contact with the titaniferous iron ore, and the presence of carbon monoxide as a reducing gas in the furnace atmosphere. Analysis of a sample showing a ferric iron content of less than about 1% will indicate a conversion of the iron essentially to $Fe^{++}$ state.

Following reduction, the charge is chlorinated to convert the iron principally to ferrous chloride and to produce the titanium dioxide concentrate. The bed is maintained in turbulent motion by introduction through the bottom of air and chlorine gas. Chlorine gas is introduced at a rate and in total amount to convert the iron content at least to ferrous chloride and not more than will produce combined ferrous chloride and ferric chloride containing a major part of ferrous chloride. Air is introduced in amount to burn sufficient carbon so that the temperature in the bed is maintained between 800° and 1200° C. Under these conditions it will be found that the iron content of the reduced titaniferous iron ore may be readily chlorinated to ferrous chloride. This compound is volatile at the reaction temperatures employed, and is rapidly carried away from the reacting materials by the gases passing through, and generated as a result of reaction in the bed, into a suitable collection unit. Chlorine and air flows are shut off after the required or desired amount of chlorine has been introduced and the iron content of the mixture has been reduced to below about 3%. The residue comprises the concentrate product which may then be dumped and cooled, or further chlorinated to produce titanium tetrachloride.

Conversion of the iron oxide portion of the reduced titaniferous iron ore to ferrous chloride is readily accomplished when the following conditions are observed:

(1) The bed must be maintained at a relatively high temperature preferably between 800° C. and 1200° C. to favor conversion and separation of the iron as ferrous chloride.

(2) Sufficient carbonaceous reducing agent must be present at all times to provide the proper reducing and fuel-providing conditions and it is essential that its content be between about 15% and 35%, preferably about 25% of the reduced titaniferous iron ore.

(3) Sufficient air flow must be passed upwardly through the mixture to provide oxygen to support combustion of the carbonaceous reducing agent and to provide the proper reducing conditions in the furnace, and also to provide sweep gases to eliminate ferrous chloride from the vicinity of the reactants.

Heretofore prior workers have considered ferrous chloride an extremely objectionable material in iron and titanium chlorinating processes. It tends to sinter if retained in a fluid or semi-fluid bed of reactants and its formation has been specifically avoided. In the process of this invention, however, when the described steps are employed, ferrous chloride is readily formed and eliminated and no undesirable effects result from its formation or temporary presence.

The concentrate product from the process of this invention comprises $TiO_2$ substantially free from iron, that is, containing no more than about 3% Fe, admixed with from 10% to 35% residual carbonaceous reducing agent. As indicated above, the carbonaceous reducing agent content of the ilmenite charge in the chlorination furnace must at all times be maintained between 15% and 35% of the ore. This is applied even during the later stages so that the final product will contain substantially or almost this much as a residual condition resulting from the final stage of the chlorination process. Such a mixture, however, is ideally suited for further chlorination to produce $TiCl_4$, since the formation of this compound also requires the presence of carbon. The concentrate product resulting from the process of this invention may be subsequently directly chlorinated by reaction with additional chlorine, to produce a titanium tetrachloride suitable for production of metallic titanium or titanium pigments.

Advantageously, the practice of this invention would produce an iron chloride by-product essentially all in the form of ferrous chloride. This would realize the advantages of the invention to the fullest extent in that a useful type of $TiO_2$ concentrate would be obtained and at the same time one-third of the chlorine value normally fixed in the by-product as ferric chloride would be saved. In large scale operations, however, due to space, mass action, and equilibrium effects, such efficiency cannot ordinarily be obtained. It will be apparent that the saving of chlorine will be proportional to the ferrous chloride content of the by-product iron chloride. The saving becomes material and valuable when the ferrous chloride amounts to at least a major part of the iron chloride and the higher the ferrous chloride content, the greater the savings without deleterious effect on the processing conditions.

The following example will illustrate an embodiment of this invention.

*Example*

A 90 inch diameter shaft furnace lined with chlorine-resistant refractory was heated by building a wood fire inside. Ilmenite ore concentrate containing 63% $TiO_2$ and 22.3% Fe as oxide of average particle size about minus 100 mesh was mixed with petroleum coke of average size about 50 mesh. The coke content was 25% of the ore. When the furnace temperature was raised to about 600° C., 37.5 tons of the ilmenite coke mixture was charged to the furnace over a period of a few hours and compressed air was introduced into the charge through the bottom of the furnace at the rate of 300 pounds per hour. The air introduced and the gases produced maintained the coke and ilmenite particles in a state of turbulent motion. Combustion of a portion of the coke in the furnace raised the temperature of the charge to about 720° C. and at this point the air supply was reduced to 100 lbs. per hour. This amount of air was sufficient to maintain agitation in the bed of coke and ilmenite and to maintain the temperature of the charge but was insufficient to promote rapid and complete combustion of the coke which resulted in an excess of CO over $CO_2$ being present and strongly reducing conditions therefore existed in the charge. Samples were periodically extracted from the charge and analysed for C, $Fe^{+++}$, and $Fe^{++}$. Coke was added when its content fell below 20% of the ore. After two hours, analysis of a sample showed a ferric iron content of less than 0.5% indicating that essentially all the iron was in the reduced $Fe^{++}$ condition.

At this stage a mixture of reduced ore and carbon (coke) had been formed, which was then chlorinated to separate iron as ferrous chloride.

Air introduction was increased to 275 pounds per hour and chlorine was introduced into the bottom of the charge at an average rate of 1,300 pounds per hour. The greater air input and heat of reaction between the chlorine and ferrous iron raised and maintained the charge temperature at about 1050° C. Coke was added intermittently to maintain the coke content between 20 and 30% of the ore. Ferrous chloride was evolved during chlorination and was led out of the furnace in admixture with other gases. At the end of 15 hours chlorination a sample of the charge showed a residual iron content of less than 2% and the chlorine and air supplies were cut off and the charge dumped from the furnace and cooled. The product was found to comprise a beneficiated $TiO_2$ concentrate containing 1.3% Fe admixed with 18% carbon. The collected by-product from the off gas lines from the furnace was found to comprise 87% ferrous chloride and 10% ferric chloride, and negligible $TiCl_4$ content.

A later test run in which the concentrate produced above was further chlorinated, demonstrated its usefulness for production of $TiCl_4$ suitable for the production of titanium metal.

Reduction of the iron content of the ore in a preliminary step places the iron in condition for more efficient chlorination. The chlorination proceeds readily and the tendency for the iron to be selectively chlorinated, leaving the titanium as residual oxide, is substantially enhanced. This reduces the amount of titanium chlorinated in the iron separation step and provides an iron chloride by-product with negligible $TiCl_4$ content. Furthermore, the reducing conditions and reactivity of the iron makes possible ready conversion to ferrous chloride.

The method of this invention will produce from low grade ore, such as ilmenite, a $TiO_2$ concentrate of higher $TiO_2$ content than mineral rutile which generally contains from 3 to 5% iron oxide. The process is simple and efficient, and operation to produce a ferrous chloride by-product results in a material saving in chlorine cost.

We claim:

1. A method for producing a titanium dioxide concentrate from a titaniferous iron ore which comprises; reducing the iron content of said ore essentially to divalent state, forming a mixture of said reduced ore in the form of particles of average size between 30 mesh and 150 mesh with a carbonaceous reducing agent of average particle size between 20 and 100 mesh in amounts so that carbonaceous reducing agent amounts to between 15% and 35% of the ore, heating and maintaining said mixture in an enclosed space at a temperature between 800° C. and 1200° C. meanwhile passing chlorine and an oxygen containing gas upwardly therethrough and maintaining said mixture in turbulent motion and adding carbonaceous reducing agent to maintain the content thereof between 15% and 35% of the ore said chlorine being passed at a rate and in total amount to convert at least a major part of the reduced iron content of said ore to ferrous chloride and the remainder to ferric chloride, thereby to separate iron from said mixture principally as ferrous chloride, leaving a residue comprising a titanium dioxide concentrate substantially free from iron.

2. A method for producing a titanium dioxide concentrate from a titaniferous iron ore which comprises; reducing the iron content of said ore essentially to divalent state, forming a mixture of said reduced ore in the form of particles of average size between 30 mesh and 150 mesh with coke of average particle size between 20 and 100 mesh in amount so that the coke amounts to between 15% and 35% of the ore, heating and maintaining said mixture in an enclosed space at a temperature between 800° C. and 1200° C. meanwhile passing chlorine and air upwardly therethrough and maintaining said mixture in turbulent motion and adding coke to maintain the content thereof between 15% and 35% of the ore, said chlorine being passed at a rate and in total amount to convert at least a major part of the reduced iron content of said ore to ferrous chloride and the remainder to ferric chloride, thereby to separate iron from said mixture principally as ferrous chloride, leaving a residue comprising a titanium dioxide concentrate substantially free from iron.

3. A method for producing a titanium dioxide concentrate from a titaniferous iron ore which comprises; introducing into an enclosed space said ore in the form of particles of average size between 30 mesh and 150 mesh and carbonaceous reducing agent of average particle size between 20 mesh and 100 mesh in amount between 15% and 35% of said ore to form a mixture with said ore, heating and maintaining said mixture at a temperature between 600° C. and 800° C., meanwhile passing an oxygen-containing gas upwardly therethrough and maintaining said mixture in turbulent motion until the iron content thereof is reduced essentially to divalent state, and subsequently maintaining the reduced mixture at a temperature between 800° C. and 1200° C., meanwhile passing chlorine and an oxygen-containing gas upwardly therethrough and maintaining said mixture in turbulent motion and adding carbonaceous reducing agent to maintain the content thereof between 15% and 35% of said ore, said chlorine being passed at a rate and in total amount to convert at least a major part of the reduced iron content of said ore to ferrous chloride and the remainder to ferric chloride, thereby to separate iron from said mixture principally as ferrous chloride, leaving a residue comprising a titanium dioxide concentrate substantially free from iron.

4. A method for producing a titanium dioxide concentrate from a titaniferous iron ore which comprises; introducing into an enclosed space said ore in the form of particles of average size between 30 mesh and 150 mesh and carbon of average particle size between 20 mesh and 100 mesh in amount between 15% and 35% of said ore to form a mixture with said ore, heating and maintaining said mixture at a temperature between 600° C. and 800° C., meanwhile passing an oxygen-containing gas upwardly therethrough and maintaining said mixture in turbulent motion until the iron content thereof is reduced essentially to divalent state, and subsequently maintaining the reduced mixture at a temperature between 800° C. and 1200° C., meanwhile passing chlorine and an oxygen-containing gas upwardly therethrough and maintaining said mixture in turbulent motion and adding carbon to maintain the content thereof between 15% and 35% of said ore, said chlorine being passed at a rate and in total amount to convert at least a major part of the reduced iron content of said ore to ferrous chloride and the remainder to ferric chloride, thereby to separate iron from said mixture principally as ferrous chloride, leaving a residue comprising a titanium dioxide concentrate substantially free from iron.

5. A method for producing a titanium dioxide concentrate from a titaniferous iron ore which comprises; introducing into an enclosed space said ore in the form of particles of average size between 30 mesh and 150 mesh and carbonaceous reducing agent of average particle size between 20 mesh and 100 mesh in amount about 25% of said ore to form a mixture with said ore, heating and maintaining said mixture at a temperature between 600° C. and 800° C., meanwhile passing an oxygen-containing gas upwardly therethrough and maintaining said mixture in turbulent motion until the iron content thereof is reduced essentially to divalent state, and subsequently maintaining the reduced mixture at a temperature between 800° C. and 1200° C., meanwhile passing chlorine and an oxygen-containing gas upwardly therethrough and maintaining said mixture in turbulent motion and adding carbonaceous reducing agent to maintain the content thereof at about 25% of said ore, said chlorine being passed at a rate and in total amount to convert at least a major part of the reduced iron content of said ore to ferrous chloride and the remainder to ferric chloride, thereby to separate iron from said mixture principally as ferrous chloride, leaving a residue comprising a titanium dioxide concentrate substantially free from iron.

6. A method for producing a titanium dioxide concentrate from a titaniferous iron ore which comprises; introducing into an enclosed space said ore in the form of particles of average size between 30 mesh and 150 mesh and carbonaceous reducing agent of average particle size between 20 mesh and 100 mesh in amount between 15% and 35% of said ore to form a mixture with said ore, heating and maintaining said mixture at a temperature between 600° C. and 800° C., meanwhile passing air upwardly therethrough and maintaining said mixture in turbulent motion until the iron content thereof is reduced essentially to divalent state, and subsequently maintaining the reduced mixture at a temperature between 800° C. and 1200° C., meanwhile passing chlorine and air upwardly therethrough and maintaining said mixture in turbulent motion and adding carbonaceous reducing agent to maintain the content thereof between 15 and 35% of said ore, said chlorine being passed at a rate and in total amount to convert at least a major part of the reduced iron content of said ore to ferrous chloride and the remainder to ferric chloride, thereby to separate iron from said mixture principally as ferrous chloride, leaving a residue comprising a titanium dioxide concentrate substantially free from iron.

References Cited in the file of this patent

UNITED STATES PATENTS

| | | |
|---|---|---|
| 2,120,602 | Donaldson | June 14, 1938 |
| 2,127,247 | Dawson et al. | Aug. 16, 1938 |
| 2,184,884 | Muskat et al. | Dec. 26, 1939 |
| 2,752,300 | Cooper | June 26, 1956 |
| 2,758,019 | Daubenspeck | Aug. 7, 1956 |